(12) United States Patent
Stys et al.

(10) Patent No.: US 9,716,941 B2
(45) Date of Patent: Jul. 25, 2017

(54) FRAME RAIL-INTEGRATED SUBWOOFER ASSEMBLY AND METHOD

(71) Applicant: GM GLOBAL TECHNOLOGY OPERATIONS LLC, Detroit, MI (US)

(72) Inventors: Gregory A. Stys, South Lyon, MI (US); Richard A. Close, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 14/791,599

(22) Filed: Jul. 6, 2015

(65) Prior Publication Data
US 2017/0013336 A1  Jan. 12, 2017

(51) Int. Cl.
| | | |
|---|---|---|
| H04B 1/00 | (2006.01) | |
| H04R 1/02 | (2006.01) | |
| H04R 1/28 | (2006.01) | |
| H04R 5/02 | (2006.01) | |
| B60R 11/02 | (2006.01) | |

(52) U.S. Cl.
CPC ............ *H04R 1/2811* (2013.01); *H04R 5/02* (2013.01); *B60R 11/0217* (2013.01); *H04R 1/025* (2013.01); *H04R 2499/13* (2013.01)

(58) Field of Classification Search
CPC .......... H04R 1/028; H04R 1/02; H04R 1/025; H04R 5/02; H04R 2499/13; H04R 1/403; H04R 2205/021; H04R 1/2811; B60R 11/0217
See application file for complete search history.

(56) References Cited

U.S. PATENT DOCUMENTS

| | | | | |
|---|---|---|---|---|
| 4,903,300 A | * | 2/1990 | Polk ..................... | H04R 1/2842 181/150 |
| 6,141,428 A | * | 10/2000 | Narus .................. | H04R 1/2819 181/156 |
| 8,913,777 B2 | * | 12/2014 | Pelliccio ............. | B60N 2/0232 297/217.4 |
| 2014/0314249 A1 | * | 10/2014 | Fincham .................. | H04R 1/02 381/89 |

OTHER PUBLICATIONS

Robert Harley, Mercedes-Benz Introduces Innovative Front Bass Car-Audio System and Exclusive "Signature Sound" Demo Disc, Article from The Absolute Sound, printed Jun. 11, 2015, 5 pages.

* cited by examiner

*Primary Examiner* — Andrew L Sniezek
(74) *Attorney, Agent, or Firm* — Quinn IP Law

(57) ABSTRACT

An assembly for use in a designated listening area includes a body having a frame rail supporting or framing the body laterally adjacent to the designated listening area, and defining a cavity, and a subwoofer assembly having subwoofer speakers each defining a smaller second air volume. The subwoofer assembly is mounted to the frame rail such that the second air volumes are contiguous with and open into the first air volume. A sealing mechanism enclosed the first air volume within the cavity. A method includes providing a subwoofer assembly having subwoofer speakers defining respective second air volumes, mounting the subwoofer assembly to a frame rail laterally adjacent to the designated listening area such that the respective second air volumes are contiguous with and open into the first air volume, and sealing the first air volume with a sealing mechanism.

15 Claims, 4 Drawing Sheets

FRAME RAIL-INTEGRATED SUBWOOFER ASSEMBLY AND METHOD

TECHNICAL FIELD

The present disclosure relates to a frame rail-integrated subwoofer assembly and a method of forming the same.

BACKGROUND

Sound systems include a number of audio speakers in communication with a receiver. Various speakers may be arranged in respective forward and aft positions within a designated listening space, such as a room of a building or a passenger cabin of a vehicle, with predetermined ranges of frequency channels distributed to designated speakers. The speakers convert an amplified audio signal into sound waves via an electromagnet that, when excited, vibrates a diaphragm-like speaker cone within a speaker enclosure. For a subwoofer speaker in particular, the cone movement causes non-directional, low-frequency sound waves to propagate from the speaker enclosure. Subwoofers can thus work in conjunction with front and rear audio speakers to help provide the deep bass sounds necessary for a full-spectrum "surround sound" audio experience.

SUMMARY

A frame rail-integrated subwoofer assembly is disclosed herein. The present design is intended to reduce the required mass and packaging space of conventional subwoofer enclosures, and operates by sealing an air volume present within a hollow longitudinal frame rail, e.g., laterally adjacent to an occupant of a vehicle, such as a front seat passenger and/or a driver, and placing the sealed air volume in communication with smaller enclosed air volumes of one or more individual subwoofer speakers. As is well known in the art, an audio speaker typically requires captive air volume to allow for physical movement of the speaker cone and for propagation of generated sound waves. As a result, for low-frequency sound waves a relatively large subwoofer is conventionally used to enclose the required air volume in a sealed speaker box. In a vehicle, the sealed speaker box is ordinarily attached to or positioned between interior trim panels and adjacent structure, e.g., door panels or a bulkhead. The use of such conventional subwoofers can intrude on the designated listening space or cargo storage areas. By taking advantage of captive air volume existing within a hollow frame rail, which in a vehicle embodiment may be a longitudinal frame rail running laterally adjacent to an occupant of the vehicle, i.e., to the left and/or right side of a forward-facing driver or passenger and in close proximity to a passenger cabin, the present design enables a wider variety of sound system configurations and speaker placement options.

In order to provide this and other advantages, an assembly is disclosed herein that, in a particular embodiment, includes a body having a frame rail that supports or frames the body, and that also includes one or more subwoofer assemblies. The frame rail is laterally adjacent to the designated listening space and defines a sealed cavity. To seal the cavity, a sealing mechanism is positioned within the cavity so as to enclose a first air volume at the laterally adjacent position. A subwoofer assembly having one or more subwoofer speakers, each defining a respective second air volume, is integrated into the frame rail such that the second air volumes are contiguous with and open into the first air volume to thereby form a total subwoofer air volume.

The assembly may include a sub-floor supported by the frame rail, in which case the subwoofer assembly is covered by the sub-floor.

The body may define a third air volume, such as within an A-pillar or another pillar or body structural component in an example vehicle configuration. The subwoofer assembly may include a subwoofer port tube, with the subwoofer port tube opening into the designated space or into the body structural component. When an open end of the subwoofer port tube is positioned within the body structural component, the third air volume is placed in fluid communication with the first air volume via the port tube such that the subwoofer assembly is acoustically ported into the body structural component. When the port tube opens into a designated listening space, such as into a passenger cabin, the first air volume is in fluid communication with the designated listening space via the port tube such that the subwoofer assembly is acoustically ported into the designated listening space.

Each of the individual subwoofer speakers has a speaker cone with a corresponding cone axis. In a particular configuration, the speaker axes are coaxial with each other and parallel to the longitudinal axis of the rail. Alternatively, each cone axis may be orthogonally arranged with respect to a longitudinal outer wall of the rail.

A corresponding method is also disclosed that includes providing a subwoofer assembly as described above, i.e., having one or more subwoofer speakers each defining a second air volume that is smaller than the first air volume. The method includes integrating the subwoofer assembly into a frame rail, e.g., a frame rail of a vehicle, at a position that is laterally adjacent to a designated listening area from the perspective of a listener, e.g., a driver or passenger of a vehicle, with the frame rail having a longitudinal axis and defining a cavity with the first air volume. The second air volumes are contiguous with the first air volume. The method further includes sealing the first air volume using end plates or another suitable sealing mechanism(s).

The above-described and other features and advantages of the present disclosure are readily apparent from the following detailed description of the best modes for carrying out the disclosure when taken in connection with the accompanying drawings.

DETAILED DESCRIPTION

Figure 1:
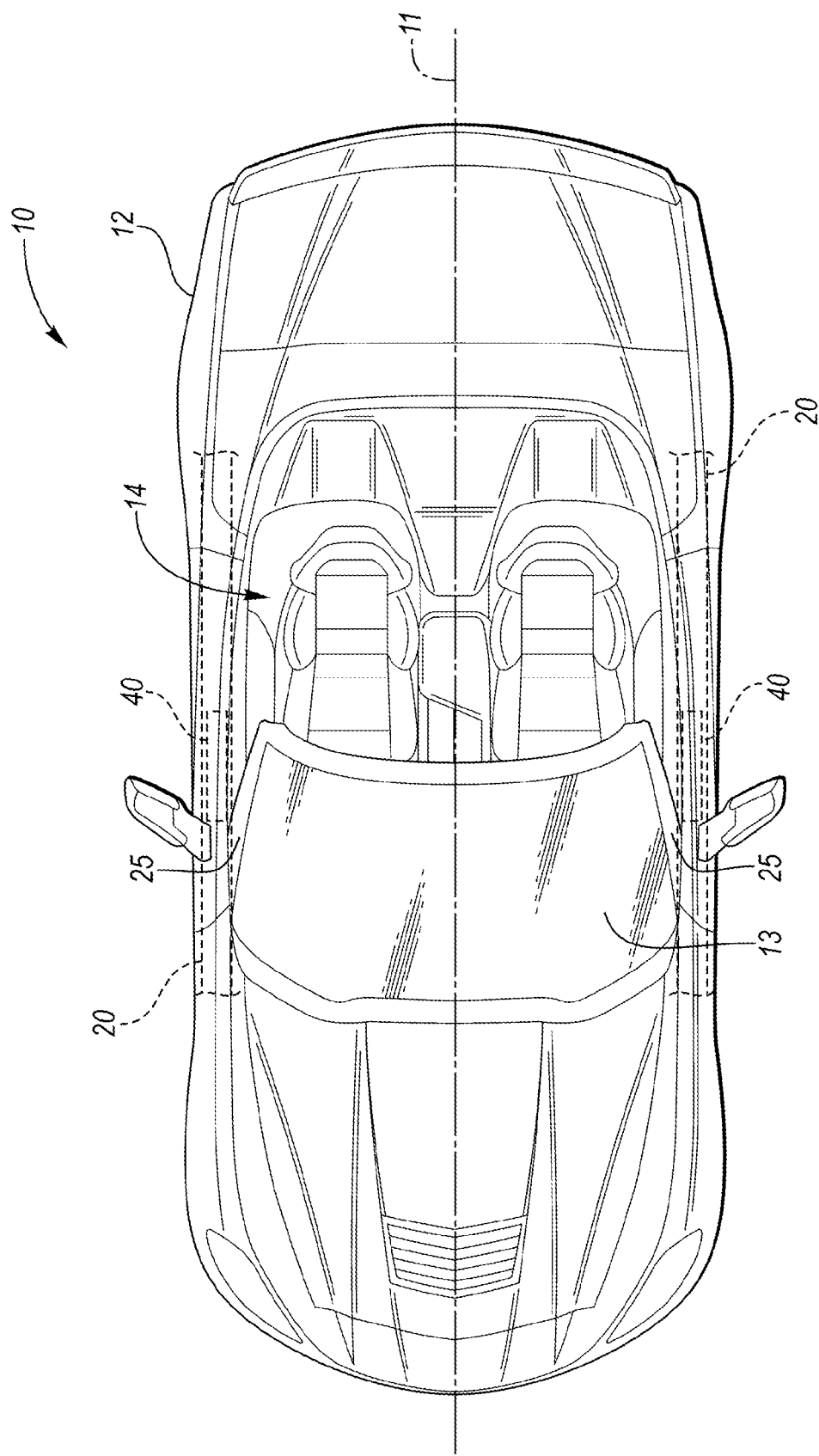
FIG. 1 is a schematic plan view illustration of an example vehicle having a frame rail-integrated subwoofer assembly as set forth herein.

With reference to the drawings, wherein like reference numbers refer to the same or similar components throughout the several views, an example vehicle 10 is shown in FIG. 1 having, as a vehicle assembly, a frame rail 20 and a frame rail-integrated subwoofer assembly 40. The vehicle 10 includes a body 12 that defines a passenger cabin 14, with the passenger cabin 14 forming a non-limiting illustrative example embodiment of a designated listening area. The design described below may be applied to any structure having a body defining or positioned within a designated listening area and supported or framed by frame rails 20 or other suitably hollow construction at a position that is laterally adjacent to the designated listening area, and thus to the left and/or right of a front-facing occupant of the example vehicle 10. Example non-vehicular embodiments may include, for instance, household applications in which the designated listening area is a room and the frame rails are portions of or installed within the surrounding walls defining the room, or are rail portions of a case or frame of an electronic device. For illustrative simplicity and consistency, the vehicle 10 of FIG. 1 is used hereinafter as an example configuration.

The body 12, which has a longitudinal axis 11, is supported or framed via the longitudinal frame rails 20. The frame rails 20 are "longitudinal" in the sense that the frame rails 20 extend along a length of the vehicle 10 laterally adjacent to the passenger cabin 14 and parallel to the longitudinal axis 11. The frame rails 20 may be laterally joined via one or more transverse cross members and body mount brackets (not shown) so as to form an undercarriage or frame assembly as is well known in the art. A windshield 13 of the vehicle 10 is supported by an A-pillar 25 of the vehicle body 12, with the A-pillar 25 included in some embodiments as additional body structure to further enhance the overall sound performance, as is set forth below with reference to FIG. 3.

Figure 3:
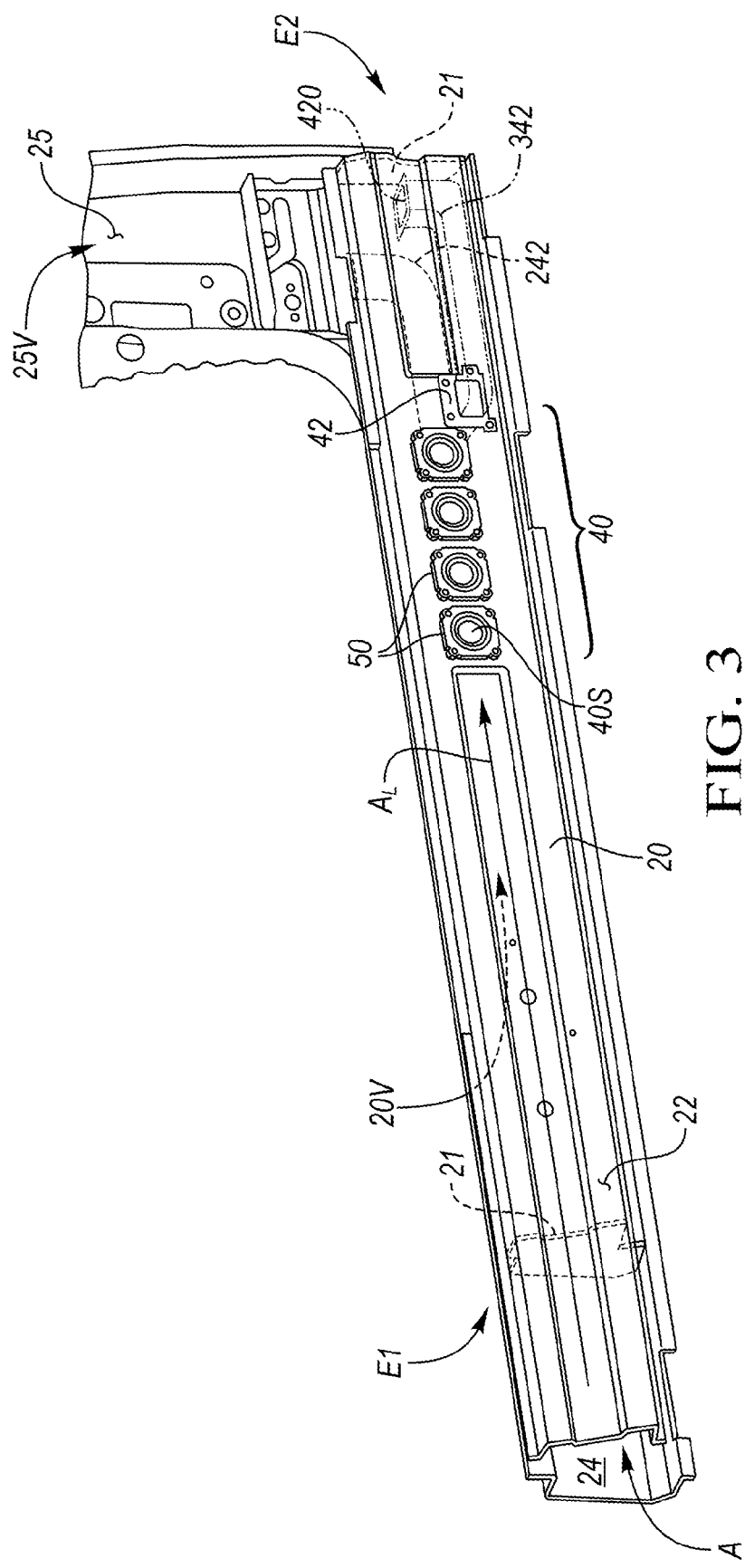
FIG. 3 is a schematic perspective view illustration of a portion of a rail, a pillar, and a frame rail-integrated subwoofer assembly according to an alternative embodiment.

As best shown in FIG. 3, the frame rails 20 include longitudinal side walls 22 and 24 that are spaced apart, and therefore the frame rails 20 define an internal cavity (arrow A), with a first air volume 20V defined between sealing mechanisms 21. The sealing mechanisms 21 are used to seal the first air volume 20V at the distal ends E1 and E2 of the cavity (arrow A) and, along with the structure of the frame rail 20, to define and enclose the first air volume 20V laterally adjacent to the designated listening area, or in other embodiments, aft of the designated listening area such as in a rear cargo area (not shown). Drain holes or tooling support tube openings located between the distal ends E1 and E2 should likewise be sealed to the extent possible, e.g., using plugs or another suitable closure device. The sealing mechanism(s) 21 may be positioned as needed anywhere along the length of the frame rails 20 so as to define the first air volume 20V with a calibrated size and desired acoustic performance.

Within the scope of the present disclosure, the subwoofer assembly 40 includes one or more subwoofer speakers 40S integrated directly into the structure of the frame rail 20, e.g., at the above-mentioned laterally adjacent position. As used herein, the term "integrated" means fastened to, inserted into, or otherwise incorporated with the frame rails 20 and, in some embodiments, other body structure to form a unified assembly in which the first air volume 20V acts as part of a larger continuous subwoofer air volume. For instance, a respective subwoofer assembly 40 may be integrated into a respective frame rail 20 on either side of the passenger cabin 14, or a single subwoofer assembly 40 may be integrated into a single one of the frame rails 20, e.g., on a driver or passenger side of the passenger cabin 14.

Figure 4:
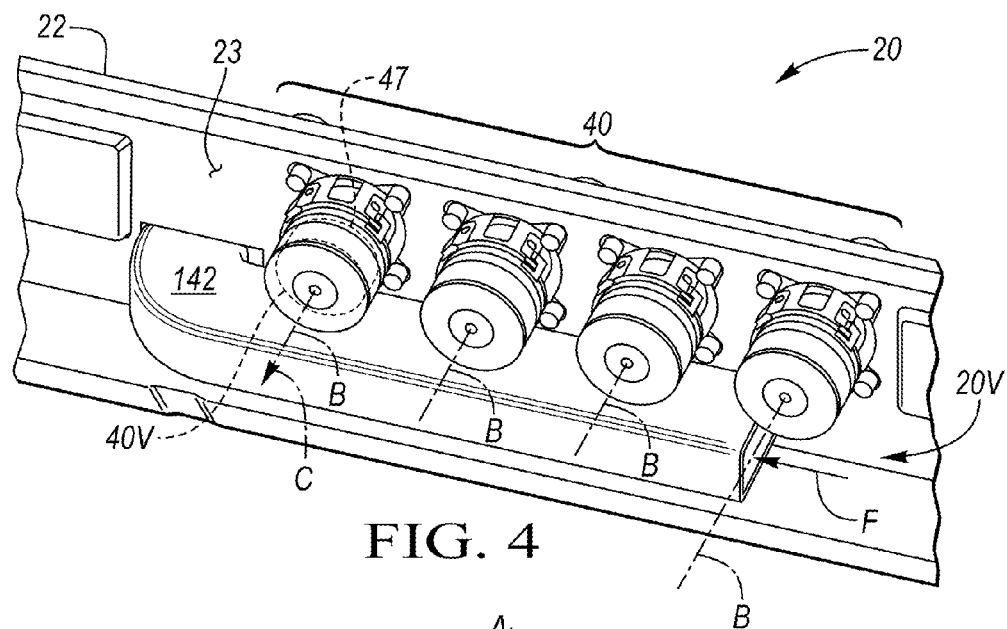
FIG. 4 is another schematic perspective view illustration of the frame rail-integrated subwoofer assembly of FIG. 3.

Each subwoofer speaker 40S includes an enclosure defining a relatively small second air volume, i.e., the second air volume 40V shown schematically in FIG. 4. When the subwoofer assembly 40 is integrated with a given frame rail 20, the smaller second air volume 40V of each subwoofer speaker 40S is contiguous with and opens into the larger first air volume 20V defined by the frame rail 20. In this manner, the relatively large first air volume 20V present within the frame rails 20 combines with the smaller second air volumes 40V of the various subwoofer speakers 40S to form a larger, continuous total subwoofer air volume equal to [40V+N (20V)], with N being the number of subwoofer speakers 40S used in the design. Such a design can help generate the rich, deep bass sounds that are desirable in certain sound systems, particularly when listening to bass-intensive music or videos.

Figure 2:
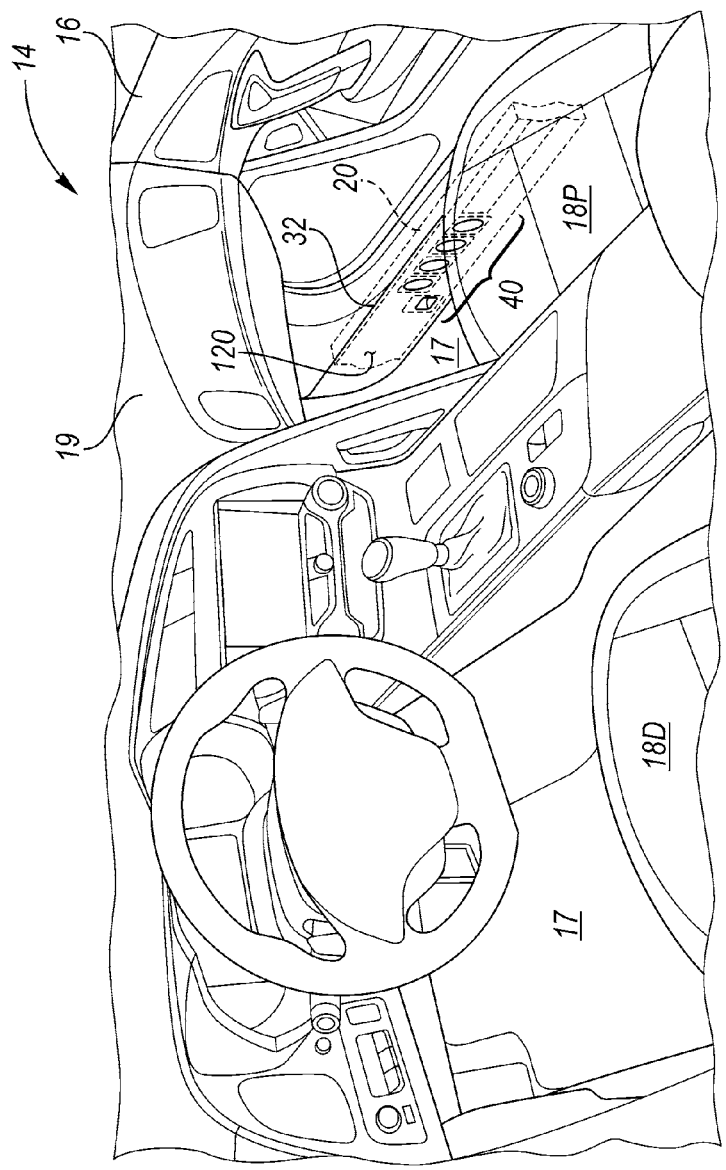
FIG. 2 is a schematic perspective view illustration of a designated listening area in the form of an example passenger cabin of the vehicle shown in FIG. 1 depicting possible placement of the subwoofer assembly.
Figure 2A:
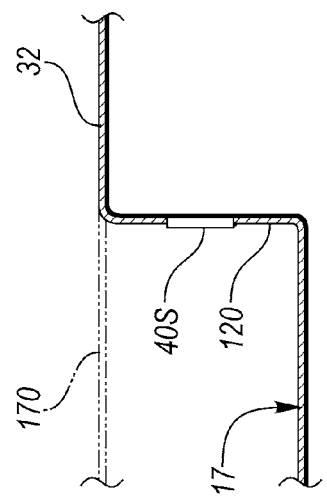
FIG. 2A is a schematic end view illustration of a portion of the passenger cabin shown in FIG. 2 depicting an optional subfloor configuration.

Referring to FIG. 2, the passenger cabin 14 may include a driver seat 18D and a passenger seat 18P, each of which is positioned facing a dash board 19. Passenger doors 16 flank the respective driver and passenger seats 18D and 18P. The subwoofer assembly 40 may be positioned along a frame rail interface surface 120 running adjacent to a floor 17 of the passenger cabin 14 alongside an occupant seated in one of the seats 18D or 18P, and extending orthogonally with respect to a plane of the floor 17 in the manner of a baseboard. The frame rail interface surface 120 may terminate at a sill plate 32 located just below a passenger door 16. As is known in the art, in some trucks and sport vehicles the frame rail interface surface 120 may stand approximately 50-70 mm above the level of the floor 17. In other designs, such as the optional design depicted in FIG. 2A, a subfloor 170 may be used to cover the frame rail interface surface 120 and the subwoofer assembly 40 such that the sill plate 32 is level with the subfloor 170. Because low-frequency sound of the type emanating from the subwoofer assembly 40 is non-directional, the presence or absence of the subfloor 170 of FIG. 2A is not expected to affect audible bass sound performance, and thus either design may be contemplated within the intended inventive scope.

FIG. 3 depicts an example frame rail 20 and a portion of the example A-pillar 25 of the vehicle body 12 shown in FIG. 1, which as is known in the art is the foremost pillar of the vehicle 10. Such an A-pillar 25 helps secure the windshield 13 in place and serves other structural support functions. In other embodiments, the vehicle 10 may include a B-Pillar just aft of the driver's seat and, when rear passenger seats are used, a C-Pillar located behind the rear passenger's seat. As explained below, the subwoofer assembly 40 may be ported directly into the A-pillar 25 or any additional pillars (not shown) to enhance the audio performance of the subwoofer assembly 40.

A longitudinal axis ($A_L$) of the frame rail 20 is generally parallel to the axis 11 of the vehicle 10 of FIG. 1. An elongated cavity within the hollow frame rails 20 defines the first air volume 20V, with the subwoofer assembly 40 bolted or fastened to the frame rail 20 using a perimeter bracket 50 or other suitable structure, thereby integrating the subwoofer assembly 40 into or with the structure of the frame rail 20. Construction of the frame rail 20 may vary with the intended design, and may include an assembly of the longitudinal side walls 22 and 24, e.g., sheet metal or a composite material that is extruded, welded, stamped, or hydroformed in a few non-limiting process examples.

To optimize audio performance of the subwoofer assembly 40, the first air volume 20V should be substantially sealed, with "substantially" in this instance meaning a level of sealing sufficient for providing the desired acoustic performance. While a completely sealed first air volume 20V is desirable, this level of sealing may not be practicable, and thus an acoustic sealing corresponding to about 95 percent or more of the total surface area of body structure defining the boundaries of the first air volume 20V may be considered sufficient in an example embodiment. The sealing mechanisms 21 used to seal the ends E1 and E2 of the first air volume 20V may include end plates constructed of metal, plastic, or other suitable structural material disposed at the ends E1 and E2 as shown schematically in FIG. 3, acoustic foam, plastic plugs, inserts, or the like. Any other openings defined by the frame rail 20, such as those typically present for the purpose of fluid drainage or fixtures, likewise should be sealed to the extent possible so that the first air volume 20V is substantially sealed.

The subwoofer assembly 40 shown in FIG. 3 may include a subwoofer port tube opening 42. As is well known in the art, acoustic porting such as via the example subwoofer port tube opening 42 provides additional air flow and low-frequency sound channeling, and thus provides a tuned bass sound relative to non-ported subwoofer designs. Ported subwoofers tend to be more efficient than non-ported varieties, and thus smaller subwoofer speakers 40S may be used in the present design relative to conventional single speaker configurations. The reduction in size of the subwoofer speakers 40S is accounted for by providing a suitable number of subwoofer speakers 40S to approximate a total speaker surface area of a desired single-speaker design, e.g., four or more subwoofer speakers 40S per frame rail 20 in a possible configuration, and then aligning the subwoofer speakers 40S along the frame rail 20 within the passenger cabin 14.

In some embodiments, such as the embodiment shown in FIG. 4, the subwoofer port tube opening 42 is positioned in the passenger cabin 14 in fluid communication with the first air volume 20V via an elongated port tube 142. In this manner, sound waves emanating from the subwoofer speakers 40S are ported directly into the passenger cabin 14 via the subwoofer port tube opening 42 defined by the port tube 142. The position of the port tube opening 42 may vary from the position depicted in FIG. 3. For example, the port tube opening 42 may be moved forward toward the dash board 19 to port farther away from the driver or passenger of the vehicle 10. In such an embodiment, an elongated port tube 342 may protrude from the surface 120 and extend along the surface 120, rather than inside of the frame rail 20. Such a design may be more conducive to aftermarket assembly given the challenge of accessing internal structure of the A-pillar 25 and frame rails 20, as the elongated port tube 342 could be attached to the surface 120 to place the first air volume 20V in communication with ambient air in the passenger cabin 14 via the port tube 342 and an external port tube opening 420 as shown in phantom in FIG. 3.

Alternatively, a third air volume 25V defined by the A-pillar 25, which is shown open on one side in FIG. 3 for illustrative clarity but is, like the frame rail 20, hollow as is known in the art, or another pillar, frame, or body structural member, may be used as a target air volume, e.g., by connecting the second air volume 40V to the third air volume 25V of the A-pillar 25 via an alternatively routed port tube 242 as indicated in FIG. 3. In such an embodiment, sound waves from the subwoofer speakers 40S are alternatively ported into the third air volume 25V, a benefit of which is direction of low-frequency air disturbances away from the driver or passenger. As will be appreciated by those of ordinary skill in the art, when the subwoofer assembly 40 is used in other portions of the passenger cabin 14, such as adjacent to rear seats (not shown), the identity of the pillar that is used can change, e.g., a B-pillar or C-pillar may be used in lieu of the A-pillar 25, without departing from the intended inventive scope.

FIG. 4 illustrates the frame rail 20 and a body structure-integrated subwoofer assembly 40 from the perspective of the first air volume 20V, with the individual subwoofer speakers 40S projecting into the first air volume 20V along a cone axis B from an inner surface 23 of the rail side wall 22. Omitted from FIG. 4 is detail of the required electrical wiring and connections to each of the speakers 40S, with such connections being necessary for providing the required low-frequency electrical current from a receiver (not shown) needed to drive the subwoofer assembly 40 as is known in the art.

Also visible from the perspective of FIG. 4 is the optional port tube 142 noted above, e.g., an elongated, double open-ended shaped tube of plastic or oilier suitable material. Further to the function of the port tube 142, whenever a speaker is acoustically driven, a speaker cone 47 housed therein is displaced to some extent in the direction of arrow C so as to create an inward air pressure. Air pressure in a ported speaker design is redirected via the port tube 142 to a target volume, as indicated by arrow F, for instance into the passenger cabin 14 shown in FIGS. 3 and 4 or into the third air volume 25V defined by the A-pillar 25. In this manner, vibration and subsequent motion of each speaker cone 47 along a respective cone axis B redirects sound waves out of the sealed first air volume 20V and through the subwoofer port tube opening 42, which can help boost the resultant sound level.

The length of the port tubes 142, 242 and the area and placement of the subwoofer port tube opening 42 within the passenger cabin 14 is a matter of design preference related to the particular sound qualities being generated. Likewise, while an example embodiment of four subwoofer speakers 40S are used in the subwoofer assembly 40 of FIGS. 3 and 4, any number of subwoofer speakers 40S may be used. As subwoofer audio performance is largely predicated on the total area of the subwoofer speakers 40S, it is envisioned that multiple subwoofer speakers 40S will ordinarily be used to provide the desired bass sound, but single speaker designs are not precluded, for instance one elongated subwoofer speaker 40S having a similar total surface area to that of a conventional circular subwoofer speaker.

Figure 5:
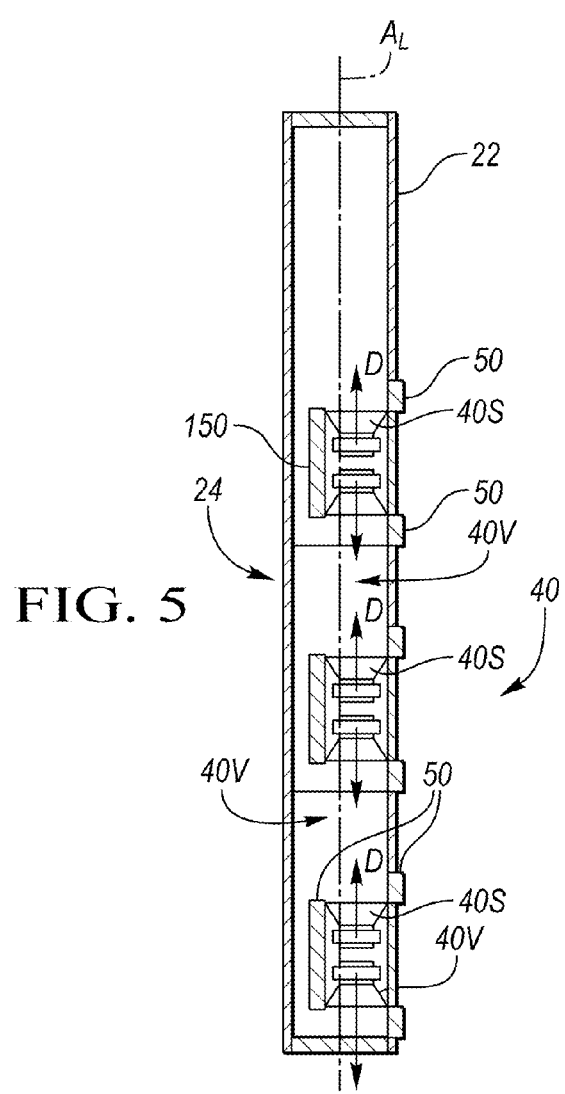
FIG. 5 is a schematic plan view illustration of an alternative coaxial configuration usable as part of the frame rail-integrated subwoofer assembly shown in FIGS. 3 and 4.

Referring to FIG. 5, in an alternative embodiment the individual subwoofer speakers 40S of the speaker assembly 40 is shown schematically to illustrate a configuration in which the subwoofer speakers 40S are positioned back-to-back and coaxially aligned between the longitudinal side walls 22 and 24 along the longitudinal axis $A_L$ of the frame rail 20. That is, the speaker cone 47 of the subwoofer speakers 40S are coaxial with each other and parallel to the longitudinal axis $A_L$ of the frame rail 20. In the alternative embodiment of FIG. 5, the subwoofer speakers 40S are arranged in opposite pairs within a support housing 150 and fire away from each other along their respective cone axes B, with such motion indicated by arrows D. The result of this configuration is that the subwoofer speakers 40S mechanically cancel each other while being acoustically additive. Such a design stands as an alternative to the configuration of FIGS. 3 and 4, wherein the cone axis B of each subwoofer speaker 40S is arranged orthogonally with respect to the side wall 22 of the frame rail 20.

Using the designs disclosed above, a bass box or subwoofer functionality is provided that utilizes space inside of existing body structural elements at a position laterally adjacent to occupants of the vehicle 10 as part of the volume for a subwoofer enclosure. One may envision the present designs being integrated upon production of a vehicle 10 as well as via the aftermarket. In the latter approach, for instance, a method may be employed according to the above description. For instance, an aftermarket supplier or original equipment manufacturer may provide the subwoofer assembly 40 having a plurality of subwoofer speakers 40S each defining a second air volume 40V as best shown in FIG. 4. Then, the subwoofer assembly 40 may be mounted to or otherwise integrated with a longitudinal frame rail 20 of a vehicle, e.g., the vehicle 10 of FIG. 1, that has a longitudinal axis $A_L$ and defines an elongated cavity with a first air volume 20V along the longitudinal axes $A_L$, such that the respective second air volume 20V of each subwoofer speaker 40S is contiguous with the first air volume 20V as noted above. The sealing mechanisms 21 are then positioned between the walls 22, 24 of the frame rails 20 to enclose and substantially seal the first air volume 20V within the cavity (arrow A of FIG. 3) using the sealing mechanism 21, such that a total subwoofer volume is formed from a combination of the sealed first air volume 20V and the individual speaker air volumes 40V.

In mounting the subwoofer assembly 40 to the longitudinal frame rail 20, this process may include forming a plurality of openings 48 in the side wall 22 of the frame rail 20 as shown in FIGS. 3 and 4, e.g., via a metal punch or cutting tool, and then inserting the subwoofer speakers 40S into the openings such that the subwoofer speakers 40S project into the first air volume 20V as best shown in FIG. 4.

Using the above-described design and method, the subwoofer assembly 40 uses the subwoofer speakers 40S arranged in the passenger cabin 14 shown in FIGS. 1 and 2 to obtain similar a surface speaker surface area to that of a larger conventional subwoofer speaker. Due to the proximity of the frame rails 20 to the floor 17 in certain vehicles, the available height just below the door sill 32 laterally adjacent to an occupant of the vehicle 10 of FIG. 1 or another vehicle or structure may be fully utilized to help enhance the audio performance of a given vehicle sound system.

While the best modes for carrying out the disclosure have been described in detail, those familiar with the art to which this disclosure relates will recognize various alternative designs and embodiments for practicing the disclosure within the scope of the appended claims.

The invention claimed is:

1. An assembly for use in a designated listening area, the assembly comprising:
    a body defining the designated listening area and having a longitudinal frame rail that defines a cavity, wherein the longitudinal frame rail supports the body and has a longitudinal axis that is laterally adjacent to the designated listening area;
    a sealing mechanism positioned within the cavity for sealing a first air volume within the cavity; and
    a subwoofer assembly having a plurality of subwoofer speakers each having a speaker cone with a respective coaxial cone axis, wherein the cone axes are parallel to the longitudinal axis of the longitudinal frame rail, each speaker cone defining a respective second air volume, wherein the subwoofer assembly is integrated into the frame rail at a position that is laterally adjacent to the designated listening area, such that the second air volumes are contiguous with and open into the first air volume to thereby form a total subwoofer air volume.

2. The assembly of claim 1, further comprising a sub-floor supported by the frame rail, wherein the subwoofer assembly is covered by the sub-floor.

3. The assembly of claim 1, wherein the cavity includes distal ends, and wherein the sealing mechanism includes a pair of end plates forming the distal ends.

4. The assembly of claim 1, wherein the body defines a third air volume and the subwoofer assembly includes a subwoofer port tube defining a port tube opening, and wherein the subwoofer port is in fluid communication with the third air volume via the port tube such that the subwoofer assembly is acoustically ported into the third air volume via the port tube opening.

5. The assembly of claim 4, wherein the body is a vehicle body defining a passenger cabin as the designated listening area, and wherein the vehicle body includes a pillar defining the third air volume.

6. The assembly of claim 5, wherein the subwoofer assembly includes a port tube defining a subwoofer port tube opening, and wherein the subwoofer port tube opening is positioned in the passenger cabin and is in fluid communication with the first air volume via the port tube such that the subwoofer assembly is acoustically ported into the passenger cabin via the port tube opening.

7. The assembly of claim 1, wherein the body includes a floor and a frame rail interface surface adjacent and orthogonal to the floor, the assembly further comprising:
    a bracket connecting the subwoofer assembly to the longitudinal frame rail adjacent to the frame rail interface surface such that the plurality of subwoofer speakers are positioned along the frame rail interface.

8. The assembly of claim 1, wherein the body is a vehicle body defining a passenger cabin, and the frame rail is a longitudinal frame rail supporting the vehicle body.

9. A method comprising:
    providing a subwoofer assembly having a port tube and a plurality of subwoofer speakers, the port tube defining a port tube opening, and the subwoofer speakers each defining a respective speaker air volume;
    providing a longitudinal frame rail defining a cavity having a cavity air volume;
    forming a plurality of openings in a side wall of the longitudinal frame rail;
    inserting each of the subwoofer speakers into a respective one of the openings in the side wall such that the subwoofer speakers project into the cavity air volume;
    mounting the subwoofer assembly to the longitudinal frame rail at a position that is laterally adjacent to a designated listening area defined by a vehicle body having the longitudinal frame rail and a pillar, wherein the longitudinal frame rail has a longitudinal axis and defines the cavity along the longitudinal axis, such that the respective speaker air volumes of each of the subwoofer speakers is contiguous with and opens into the cavity air volume;
    connecting the port tube to a pillar air volume defined by the pillar such that the speaker air volumes are in fluid communication with the pillar volume via the port tube opening; and
    sealing the cavity air volume using a sealing mechanism such that a total subwoofer volume is formed from the sealed cavity air volume and the respective speaker air volume of each of subwoofer speakers.

10. The method of claim 9, wherein sealing the cavity air volume includes positioning a pair of end plates within the cavity.

11. The method of claim 9, the method further comprising: positioning the subwoofer port tube opening in a passenger cabin of a vehicle having the vehicle body such that the cavity air volume is in fluid communication with the passenger cabin via the port tube.

12. The method of claim 9, wherein each of the subwoofer speakers has a speaker cone with a respective cone axis, and wherein mounting the subwoofer assembly to the longitudinal frame rail includes arranging the cone axes coaxially with respect to each other and parallel to the longitudinal axis of the frame rail.

13. The method of claim 12, wherein mounting the subwoofer assembly to the longitudinal frame rail includes arranging the cone axes orthogonally with respect to the longitudinal outer wall of the longitudinal frame rail such that the subwoofer speakers project radially from the longitudinal outer wall into the air volume of the longitudinal frame rail.

14. The method of claim 9, wherein the vehicle body defines a passenger cabin as the designated listening area.

15. A vehicle comprising:
a vehicle body defining a passenger compartment, and having a floor, a pillar, and a longitudinal frame rail, wherein the longitudinal frame rail is configured to support the vehicle body along a longitudinal axis of the vehicle body and defines a first air volume, and wherein the pillar defines a third air volume;
a frame rail interface surface running adjacent and orthogonal to the floor;
a subwoofer assembly having a subwoofer speaker defining a second air volume; and
a bracket connecting the subwoofer assembly to the longitudinal frame rail;
wherein the subwoofer assembly is positioned within a cavity of the longitudinal frame rail laterally adjacent to the passenger compartment such that the subwoofer speaker projects into the first air volume, and such that the second and third air volumes are contiguous with and open into the first air volume to form a total subwoofer air volume.

* * * * *